Patented Feb. 13, 1940

2,189,774

UNITED STATES PATENT OFFICE 2,189,774

COLOR STABILIZATION OF GREEN VEGETABLES

James S. Blair, Maywood, Ill., assignor to American Can Company, New York, N. Y., a corporation of New Jersey No Drawing. Application March 16, 1939, Serial No. 262,305

4 Claims. (Cl. 99—186)

The present invention relates to a method of canning green vegetables which prevents, to a large extent the loss of the natural green color as well as the natural flavor and texture during the commercial process of sterilization by heat and is particularly directed to a method of canning which inhibits the loss of pigment magnesium by maintaining a slight alkaline condition within the vegetable tissue throughout the successive steps of the canning operation while controlling ionic equilibria to preserve natural texture.

The present application constitutes a continuation in part over what is disclosed in my copending application Serial Number 128,858, filed March 3, 1937, for "Color stabilization of green vegetables" but features the presence of certain improvements thereover.

The present invention provides a method of canning green vegetables such as peas, spinach, asparagus, green beans and the like featuring the use of chemical reagents selected on the basis of the anionic characteristics of vegetable tissue itself. These anionic characteristics present a two-fold aspect. On the one hand the vegetable tissue possesses the property of uniting with various cations or of establishing with a water solution a definite cationic equilibrium which is determinative in regard to the texture of the vegetable. On the other hand, the vegetable tissue possesses to a high degree a buffer capacity which renders it unnecessary to use "mild" alkaline reagents or "buffer salts" for the purpose of pH control.

An object, therefore, of the present invention is the provision of a method of canning utilizing in the various steps of procedure chemical reagents whose cations exert a favorable influence as to texture at each stage of the canning procedure.

A further object is the provision of such a canning method wherein the distinctive buffer capacity of the vegetable tissue itself is recognized in the pH control and accordingly drastically alkaline hydroxides are used in small concentration.

Numerous other objects and advantages of the invention will be apparent as it is better understood from the following description which is of a preferred embodiment thereof.

Reference has been made in the past to the principle of pH control in connection with the protection of the natural green color of vegetables in canning. These attempts have not succeeded in producing a desirable product. They have failed in practice because they have had deleterious effects on the flavor and more particularly on the texture of the vegetables. In this respect consideration may be had of an article by W. B. Adam, Food technology, vol. 1, page 343 (1932).

In "The Dier's Assistant," by James Haigh, published by Paraclete Potter of Poughkeepsie, New York, in 1813, mention is made of the fact that the color of certain green plant extracts is protected by an alkaline environment, so that these extracts may be used to dye woolen cloth. It is believed that this is the earliest recorded observation as to the stabilizing effect of an alkaline environment on chlorophyll.

Non-ionic magnesium is an essential constituent of chlorophyll occurring in constant proportions therein. The ash of pure chlorophyll is pure magnesium oxide. The property of greenness in chlorophyll and its immediate derivatives is correlated with the retention of this non-ionic or pigment magnesium. These facts were established by Willstätter and his co-workers during the period from 1906 to 1915. Willstätter furthermore showed that the pigment retains its constituent magnesium much better in an alkaline than in an acid environment.

In the description that follows green peas will be considered by way of example and the various steps of canning peas according to the present invention will show how the desirable results of color retention, favorable texture and unimpaired flavor are obtained.

As an adjunct to the development of the canning method of the present invention an analytical procedure has been worked out for determining the pigment magnesium content as distinguished from the total magnesium content of the peas. This analytical procedure has shown that the green pigment of peas loses its constituent magnesium completely in ordinary methods of canning whereas the pH control involved in the present invention results in the retention of at least 60 percent of the pigment magnesium. As stated above, the presence of pigment magnesium is definitely correlated with the property of greenness in chlorophyll and its immediate derivatives.

The present invention involves the principle of the base-exchange or cation-exchange property of plant tissue which has been neglected heretofore in methods of canning vegetables for the retention of color. This principle is of equal importance with the principle of pH control in producing a desirable product.

The pea establishes, very rapidly even at room temperature, definite mass-action equilibria with the various cations which may be present in a water solution in which the pea is immersed. These cationic equilibria are the dominant factors in determining the texture of the plant tissue. Peas, for instance, will soften "hard" water by taking up calcium and magnesium ions therefrom, and the peas themselves will become very hard and tough in consequence. On the other hand, the calcium and magnesium content of peas may be reduced by immersion in a solution of a sodium salt and as a result the peas will become very soft and "mushy." The calcium and magnesium content of peas cannot be materially reduced by extraction with water alone, even at an elevated temperature.

The establishment of a desirable and natural texture in the canned product therefore necessitates the maintenance of a proper balance between sodium ion (together with the potassium ion which is a natural constituent of the pea tissue) on the one hand, and calcium and magnesium ions on the other, preponderance of either type of cation resulting in an undesirable texture.

It has been found furthermore that there is a certain difference between the effects of calcium ion and of magnesium ion, in that, while both of these ions have effect of increasing to a certain extent the firmness of the cotyledons of the peas, calcium ion has in addition the specific property of toughening the seed-coats. Magnesium ion does not have this effect.

The usual method of canning involves two steps, a blanch which consists in dipping the peas for a short time in water at a temperature somewhat under boiling, and a heat process which consists in cooking the vegetable with a brine at a higher temperature for a time sufficient to sterilize the product.

In the method of canning under the present invention three fundamental steps are involved rather than the two which comprise the usual canning procedure. These steps are a pre-immersion, a blanch and a heat treatment. It is fundamental in the method of canning herein described that measures be taken in each of the three steps to raise the pH level of the product. In the selection of the proper alkaline reagent to use in each of these steps the effect of the cation on texture must be taken into account, and in the paragraphs below it will be shown how the particular environment prevailing in each of the three steps is determinative in regard to the choice of the cation.

The pre-immersion step before blanching is accomplished in an alkaline solution at a temperature not above that of the room and for a suitable period such as thirty minutes. This pre-treatment enables the peas to imbibe the alkaline solution thereby establishing within the peas an alkaline reserve before the vegetable is ever subjected to heat. If peas are blanched even in an alkaline solution without the use of this pre-treatment the heat of the blanch penetrates the peas more rapidly than does the alkaline blanch solution. This rise in temperature ruptures the chloroplasts and subjects the pigment to the action of the naturally slightly acid juices of the plant tissue with a significant loss of pigment magnesium.

This pre-treatment solution should be prepared by the use of an alkaline reagent in which sodium is the cation. Such reagents are soluble and this cation does not produce a hardening of texture and does not, therefore, inhibit the penetration of the peas by the solution. Calcium and magnesium are removed from the peas to a certain extent by base-exchange with such a solution but since the temperature is low the resulting softening effect does not proceed too far and the peas are not ruptured.

In the step of blanching according to the present invention an alkaline reagent is used in which calcium is the cation. A certain moderate degree of toughness in the seed coats during the blanching step is the result of the presence of calcium in suitable concentration in the blanch solution, and is desirable in that it protects the pea from disruption and produces whole, unbroken peas and a clear brine in the final canned product.

In the processing step wherein the peas with a suitable brine are hermetically sealed in a can preparatory to the heat treatment, an alkaline reagent is added to the brine. In this alkaline reagent magnesium is preferably the cation because magnesium has no undesirable effect upon the texture of the seed coats and has only a moderate tendency to increase the firmness of the cotyledons, which is desirable.

Finally, an alkaline reagent must be added in all cases to the brine with which the vegetable is processed, in order to maintain a satisfactory green color in the final product. An alkaline blanch, and/or an alkaline pre-soak before blanching, are not in themselves sufficient to give adequate greenness, but will merely enhance the final greenness which will result if continued protection is afforded to the pigment during the heat-process by the addition of an alkaline reagent to the brine itself.

For use in the brine, an alkaline reagent in which magnesium is the cation is ideal. The use of an alkaline reagent containing calcium, in the concentration necessary for proper pH control through the process imparts to the seed-coats a decided and unpleasant toughness, while the use of an alkaline reagent containing sodium, in similarly adequate concentration, renders the peas entirely too soft.

The pea, in its anionic characteristics, has a tremendous buffer capacity and according to the present invention this fact is taken into account by the use of the hydroxides themselves, rather than the bicarbonates, carbonates, phosphates, etc., of sodium, calcium and magnesium as chemical reagents in all of the three stages.

In the pre-treatment stage sodium hydroxide is used. In the blanch calcium hydroxide is used. In the brine magnesium hydroxide is used.

When a solution or a suspension of any alkaline reagent is added to peas, an anionic equilibrium, as well as the cationic equilibrium discussed above, is established between the peas and the solution or suspension. The pH value of the solution will fall while at the same time the pH level of the buffer equilibria within the peas will rise. The relative magnitudes of these changes will depend on the reagent used, on the type of peas, on the concentration of the solution or suspension, and on volume of solution or suspension relative to weight of peas.

A given desired increase in the pH level within the peas and surrounding the pigment can be brought about by the use of a relatively small amount of hydroxide as compared with the amounts of a bicarbonate, carbonate or phosphate that would be required. These reagents one may consider as hydroxides which have already been partially neutralized by weak acids. If one attempts to use these "buffer salts" in amounts adequate for pH control, the result is an excessive amount of added cation and a wholly unnecessary added anion. The excessive amount of cation increases the problem of texture management and the unnecessary anion has an effect on flavor.

Calcium hydroxide is the proper reagent to use in the blanch and magnesium hydroxide is the proper reagent to use in the brine, from every point of view. Sodium hydroxide is also the proper reagent, from the chemical standpoint, to use in the pre-treatment solution in which the peas are immersed before blanching. There are certain practical considerations which may make it advisable to countenance the use of sodium carbonate, as an alternative to sodium hydroxide, in the pre-treatment step.

Where sodium carbonate is used in this pre-treatment step its equivalent (i. e. sodium ion) concentration must be about four times that of the sodium hydroxide in order to obtain the same adequacy of pH control. Therefore, the peas are softer, as has been found in actual practice and this is often undesirable.

However, a solution of sodium hydroxide has a greater wetting and penetrating rate than a solution of sodium carbonate and therefore the concentration of the reagent and duration of the pre-treatment are of more critical importance when the hydroxide is used. An accidental error as to concentration or duration is more likely to lead to loss in pea flavor by extraction of flavorful constituents, when sodium hydroxide, rather than sodium carbonate, is used. These considerations notwithstanding, the use of sodium hydroxide is preferable when proper control of these factors is assured.

Peas canned by the procedure described herein resemble fresh cooked peas as to character of flavor and aroma. There is a distinctive improvement in flavor over the usual canned peas and this may be ascribed to the difference in pH level. The flavor benefit accruing from pH control is not appreciated by the average observer, however, unless the peas are also endowed with a natural and pleasing texture, neither too hard nor too soft. Failure to obtain this pleasing texture by earlier methods has therefore hitherto obscured the fact that proper pH control can give a definite improvement of flavor in the canning of peas.

Finally, there are two points of practice which are of great auxiliary importance in the application of the procedure described herein. These relate to temperature and time of the heat treatment in the process step, and to favorable storage conditions after processing.

The use of a "short-high" process, i. e., a process of short duration and high temperature, such as 8 minutes at 260° F., rather than the bacteriologically equivalent 35 minutes at 240° F., is highly beneficial. The greatest benefit of the short-high process, in conjunction with the procedure for pH control as herein set forth, is that the peas and brine are not so dark as they are after the 240° process. The peas are also somewhat greener and the flavor is better.

The temperature of storage is an all-important factor in regard to the stability of the color after processing. In fact, this factor is definitely of more critical importance in storage than pH variations within the range of pH values as normally obtained by the procedure herein described. Within this normal pH range it has been found, by use of the analytical method for pigment magnesium which was mentioned above, that the natural pigment is extremely stable in storage at temperatures under 55° F. and moderately stable up to 70° F. However, deterioration of color proceeds rather rapidly at storage temperatures above 70° F.

As a concrete example of the treatment of peas according to the present invention the following steps are given in some detail. The alkaline pre-treating solution is a tenth-normal solution of sodium hydroxide and may be prepared by adding the proper amount of sodium hydroxide to water to produce such a solution.

The peas after the usual washing step are immersed in this solution which need only just cover the peas. The temperature of the solution will be 70° F. or less and the duration of treatment is 30 minutes. The solution is then drained from the peas and discarded.

The drained peas are thereupon filled into cans and covered with a 0.005 molar solution of calcium hydroxide and blanched therein.

This solution may be prepared by shaking a weighed amount of C. P. calcium oxide, making up to known volume with water to give a concentrated slurry, of which a measured volume is added to a larger known volume of water to give a calcium hydroxide solution having the above specified concentration.

The temperature of the blanch is preferably between 180° F. and 190° F. and the duration of this blanch treatment is for a suitable length of time, this time element varying somewhat with character of the peas. Five minutes may be mentioned as a suitable time under certain canning conditions. The blanch solution is then drained from the peas and discarded.

The peas are next covered with a brine containing salt and sugar in solution and magnesium hydroxide in suspension. This brine is made by adding to water U. S. P. magnesium oxide sufficient to give a 0.02 molar suspension of magnesium hydroxide. The heterogeneous character of this brine requires the maintenance of vigorous agitation in the brine tank so that a uniform amount of this reagent is filled into each can. The brine may also contain 18 pounds of salt and 25 pounds of sugar per 100 gallons. This concentration of sugar is somewhat less than the usual practice, since a part of the sugar used in ordinary canning procedure is required to offset a slight scorched taste which is not encountered in peas prepared according to the present invention.

The cans with their peas and brine are then hermetically sealed in the usual manner. An elevated closing temperature is usually desired as an incident to such sealing. The sealed cans are then given a "short-high" process such as eight minutes at 260° F. A rapid come-up time in the retort is desirable and a rapid and thorough cooling (for example down to 70° F.) is essential after processing.

In practice these processed cans are kept in storage by the canner, the ideal temperature for this purpose being less than 55° F. but above freezing.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

What I claim is:

1. The method of stabilizing the natural green color of vegetables during canning and storage which comprises immersing the product in a solution containing a drastically alkaline reagent in which sodium is the cation at a temperature not exceeding room temperature to establish an alkaline reserve, subjecting the product to a blanch solution containing calcium hydroxide to protect the product against rupture and to maintain the alkaline reserve, adding a brine containing magnesium hydroxide to the product to establish a desirable texture and to continue the maintenance of the alkaline reserve, and processing by heat.

2. The method of stabilizing the natural green color of vegetables during canning and storage which comprises immersing the product in a solution containing sodium hydroxide at a temperature not exceeding room temperature to establish an alkaline reserve, subjecting the product to a blanch solution containing calcium hydroxide to protect the product against rupture and to maintain the alkaline reserve, adding a brine containing magnesium hydroxide to the product to establish a desirable texture and to continue the maintenance of the alkaline reserve, and processing by heat.

3. The method of stabilizing the natural green color of vegetables during canning and storage which comprises immersing the product in a solution containing sodium carbonate at a temperature not exceeding room temperature to establish an alkaline reserve, subjecting the product to a blanch solution containing calcium hydroxide to protect the product against rupture and to maintain the alkaline reserve, adding a brine containing magnesium hydroxide to the product to establish a desirable texture and to continue the maintenance of the alkaline reserve, and processing by heat.

4. The method of stabilizing the natural green color of vegetables during canning and storage which comprises immersing the product in a one tenth normal solution of sodium hydroxide at a temperature not exceeding room temperature for thirty minutes to establish an alkaline reserve, subjecting the product to a blanch in a 0.005 molar solution of calcium hydroxide to protect the product against rupture and to maintain the alkaline reserve, adding a sugar, salt brine which is also a 0.02 suspension of magnesium hydroxide to the product to establish a desirable texture and to continue the maintenance of the alkaline reserve, and then processing by heat.

JAMES S. BLAIR.